United States Patent [19]
von Roesgen

[11] 4,271,573
[45] Jun. 9, 1981

[54] QUICK-CONNECT INTERCONNECTION SYSTEM

[75] Inventor: Charles A. von Roesgen, Westfield, N.J.

[73] Assignee: Bell Telephone Laboratories, Incorporated, Murray Hill, N.J.

[21] Appl. No.: 48,022

[22] Filed: Jun. 13, 1979

Related U.S. Application Data

[60] Division of Ser. No. 892,106, Mar. 31, 1978, which is a continuation-in-part of Ser. No. 630,183, Nov. 10, 1975, abandoned.

[51] Int. Cl.³ ............................................. H05K 13/06
[52] U.S. Cl. ................................. 29/33 M; 29/564.6; 29/566.4; 29/739; 29/833
[58] Field of Search ..................... 29/750, 758, 566.4, 29/33 M, 566.1, 739, 564.6, 564.1, 833, 842, 739

[56] References Cited

U.S. PATENT DOCUMENTS

| | | | |
|---|---|---|---|
| 3,168,750 | 2/1965 | Gattiker, Jr. | 7/107 |
| 3,412,449 | 11/1968 | Vickery, Jr. | 29/750 X |
| 3,564,692 | 2/1971 | Knoll et al. | 29/842 X |
| 3,624,676 | 11/1971 | Whitney | 29/739 X |
| 3,789,481 | 2/1974 | Coller | 29/739 |
| 3,844,153 | 10/1974 | Rose | 29/566.4 X |
| 3,896,534 | 7/1975 | Kaufman | 7/107 X |
| 4,189,800 | 2/1980 | Roswell | 29/566.4 |

FOREIGN PATENT DOCUMENTS

2204347 8/1973 Fed. Rep. of Germany ............. 29/833

*Primary Examiner*—William R. Briggs
*Attorney, Agent, or Firm*—Peter V. D. Wilde

[57] ABSTRACT

The construction of complex electrical circuits is simplified by performing all interconnections on one side of a component-receiving board, using slotted beam insulation-piercing connectors. Boards with or without metallization patterns are adaptable to the basic approach. Using boards with an X-Y pattern of holes arranged in columns, slotted beam connector elements are readily pressed into one side; and corresponding circuit elements such as dual-in-line packs plugged from the other side into the connector elements. The system is enhanced by a tool which feeds insulated conductor from a source and into selected slotted beams. The tool includes a retractable knife or a retractable cutter with which a given wire run may be terminated. For the manual mode, a sequence of wiring is indicated to an operator by stepping of a laser beam which illuminates successive slotted beams to be connected.

4 Claims, 32 Drawing Figures

QUICK-CONNECT INTERCONNECTION SYSTEM

CROSS REFERENCE TO RELATED APPLICATIONS

This is a division, of application Ser. No. 892,106, filed, Mar. 31, 1978, which is a continuation-in-part of application Ser. No. 630,183, filed Nov. 10, 1975, now abandoned.

BACKGROUND OF THE INVENTION

1. Field of the Invention

This invention relates to circuit assembly techniques including breadboard apparatus.

2. Description of the Prior Art

Circuit assemblies with discrete wire interconnections, are used in all phases of circuit development, exploratory as well as final, to test on a short turnaround basis the operation of a circuit or a system design. Characteristics to be desired in such interconnect systems include: a simple and versatile way to mount components; an efficient way to make interconnections; an easy way to make wiring changes; a narrow profile; and sufficient interconnection reliability so that breadboards can be used in a field environment for extended periods of time.

In digital circuit design, perforated wirewrap board and wirewrap terminals have been used extensively for circuit construction. This system accepts dual-in-line packages (DIPs) on the component side and has wirewrap terminals on the wiring side. Although this method of interconnection is widely used, it has major drawbacks. Wiring is slow: the conductor must be cut, stripped, and wrapped. Terminal identification is prone to error. Changes are difficult to make: then require unwrapping one, two, or sometimes three wires depending on how many wires are on the pin and which wire must be changed. Overall board thickness (DIP plus board plus pin length) often precludes use in standard shelves.

Thus, objects of the present invention are:
to avoid stripping and cutting of wire during wiring;
to require just one wire for each set of common connections;
to simplify wiring corrections;
to reduce the height or width of a circuitboard installation; and
to make use of semiautomatic wiring machine techniques to reduce or eliminate the possiblity of operator error in terminal identification.

SUMMARY OF THE INVENTION

The invention resides in an interconnection technique utilizing novel quick-connect insulation-piercing slotted-beam connectors mounted on a wiring board having an X-Y or similar pattern of through-holes, including when necessary metallization around and through each. Components are mounted to one side of the wiring board, and their terminals are connected by wiring together the designated corresponding slotted beam connectors. Wiring is facilitated by a tool which feeds and forces unstripped conductor into the slotted beam connector terminal. A terminal-connecting conductor is "daisy-chained" through each designated terminal and is cut at the end of a wire run.

In one embodiment, the X-Y pattern of holes takes the form of holes arranged in plural parallel columns, with discrete metal lands on the board's top and bottom surfaces each interconnecting a pair of holes. Slotted beam connector elements are pressed into the metallized holes from one side of the board, and then component terminals are mounted on either side of said board into corresponding holes and interconnected via the slotted beam connectors.

The slotted beam elements may be mounted in the module in the configuration of a DIP, for example. Additionally, or alternatively, the slotted beam elements may be mounted individually. Several advantageous hardware variants on the basic theme for providing slotted beam connectors are disclosed.

The invention, its further features, objects and advantages are more fully described in the following detailed description of the illustrative embodiment.

DESCRIPTION OF THE ILLUSTRATIVE EMBODIMENT

Figure 1:
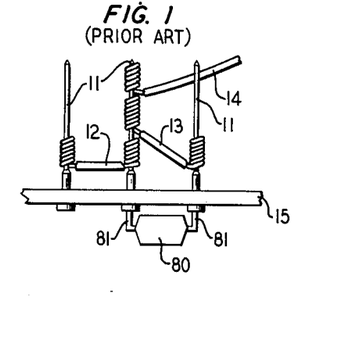
FIG. 1 is a side view of the prior art wirewrap system using wirewrap terminals with component sockets.

FIG. 1 succinctly illustrates the prior art discrete wire interconnection technique using wirewrap terminals 11 mounted in a board 15. The wirewrap connections 12, 13, 14 quickly build up width; and are relatively difficult to rearrange as illustrated, for example, by the predicament of interior connection 12.

Figure 2:
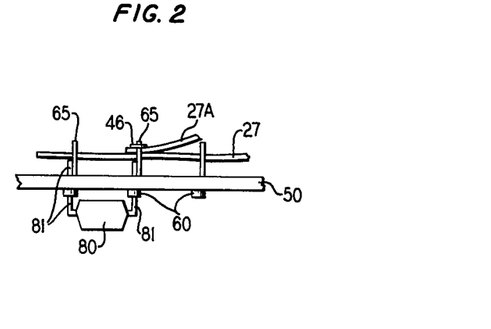
FIG. 2 is a side view of the new quick-connect system using insulation-piercing slotted-beam connector terminals with component sockets.
Figure 3A:
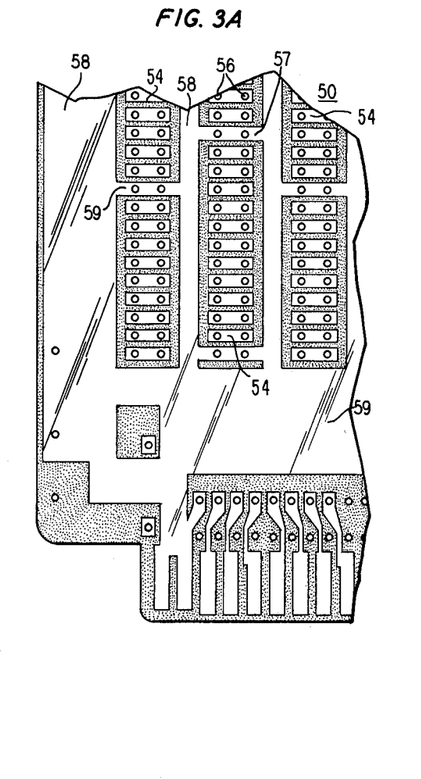
FIG. 3A is a top view of a printed circuit board used in this invention showing a hole and metallization pattern.
Figure 3B:
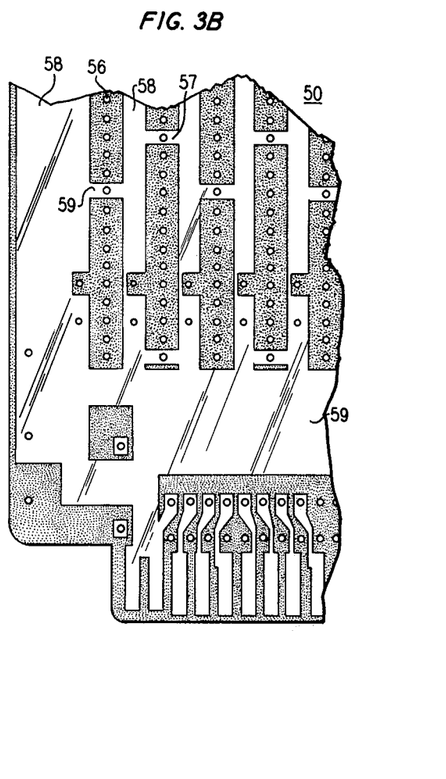
FIG. 3B is a top view of a printed circuit board used in this invention showing a hole and metallization pattern used in conjunction with connection element shown in FIG. 5.

The invention disclosed herein includes a breadboarding apparatus for mounting an electrical circuit comprising circuit elements 80 with pin terminals 81, shown in FIG. 2. The printed circuit board 50 utilizes hole pattern and metallization patterns shown in FIG. 3A, 3B and 3C. The metallization pattern consists of columns of metal lands 54 located on both the component side 51 and the wiring side 52 of printed circuit board 50. In FIG. 3A each metal land 54 and its corresponding metal land on the opposite side surrounds a pair of cylindrical metallized holes 56 which electrically connect corresponding metal lands. A separate metal grid 57 on each side of printed circuit board 50 surrounds columns of lands 54 or holes 56. Grid 57 includes vertical metallized paths 58 connected by horizontal metal paths 59. These metallized grids 57 provide on the component side 51, a power bus; the wiring side 52, a ground bus.

Figure 4:
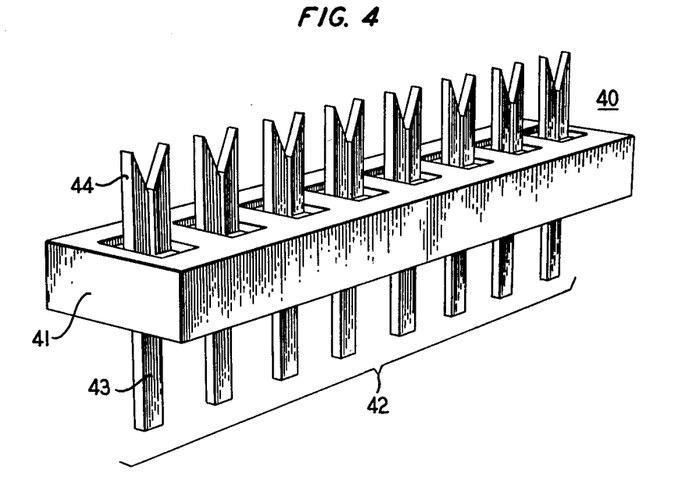
FIG. 4 is a perspective view of a connector module.

Connector module 40, shown in FIG. 4, is comprised of an elongated body 41 and electrically conductive metal elements 42 imbedded therein. These metal elements 42 have a shaft end 43 and an insulation-piercing slotted-beam connector terminal 44 (hereafter referred to as IPSBC terminal) on the opposite end. Connector module 40 can be made in long strips that can be cut to any required length.

Figure 5A:
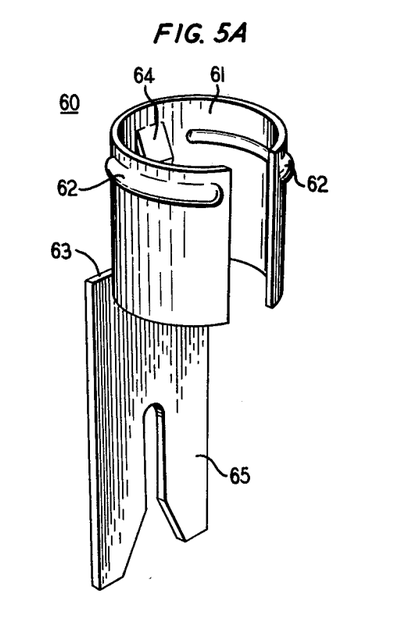
FIGS. 5A-5H are perspective views of connection elements.

The IPSBC may take the form shown in FIG. 5A. The IPSBC element 60 uses an elongated semicylindrical finger to form socket 61 for accepting a component pin terminal 81. Elongated protrusions 62 are provided as a means of mounting in a printed circuit board. Within socket 61 is a contact spring 64 to grip and electrically contact a component pin terminal 81. The socket 61 is connected to an IPSBC terminal 65 at shoulder 63 which is formed as a stop to prevent element 60 from being pushed through printed circuit board 50.

Figure 5B:
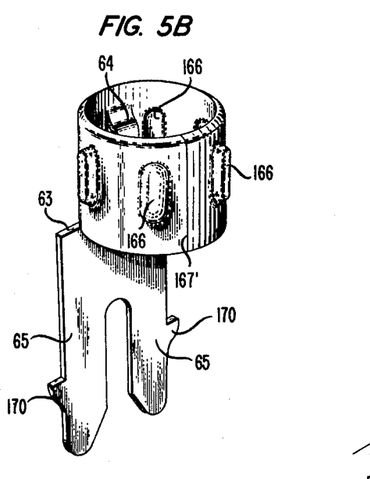

An alternative terminal structure is shown in FIG. 5B. Here the terminal 60 has a similar design with respect to the slotted-beam portion 63 and 65. However, the socket 61' has been modified so that the press fit of the socket within a hole in the mounting board is effected by means of protrusions 66. These protrusions are conveniently made by indenting the interior surface of the socket or coining when the terminal is die stamped. The gap 67, which extends along the height of the cylindrical socket in the terminal of FIG. 5A, is reduced in the structure of FIG. 5B (67') because the nature of the retaining force with this device is the frictional force of the protrusions 66 on the sidewalls of the holes, rather than the spring action of the expanding-contracting socket.

Figure 5C:
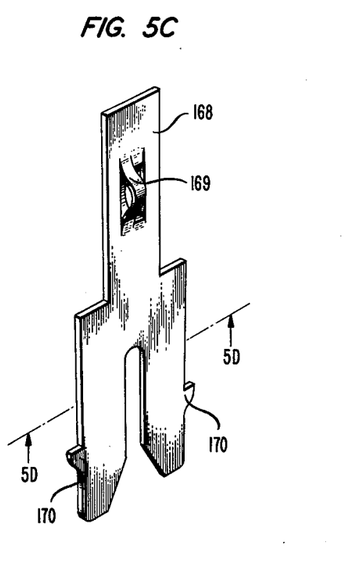

Another modified form of the slotted beam terminal is shown in FIG. 5C. This device has no socket but simply a tab 68, which can be soldered into a plated-through hole, or soldered at either or both surfaces of the supporting board, or it also can be designed to be force-fit into an appropriate hole. Spring clips 69, shown in phantom, or any similar means can be used to retain the force-fit. The tab portion of the terminal advantageously protrudes through the board and beyond, where solder connections can be applied.

FIG. 5C illustrates some useful modifications of the slotted beam portion of the terminal. Protrusions 70 are provided to aid in retaining installed wires in an organized fashion. With reference momentarily to FIG. 2, an installed wire 27 can be seen passing the terminals 45. It is advantageous that these wires be retained close to the board along a semipermanent channel or path, rather than freely and randomly crossing the board above the terminal plane where they are apt to become intertwined with one another, or be dislodged by snagging back planes or operator's tools. With reference to FIG. 4 it will be appreciated that protrusions from the facing edges of adjacent beams can allow enough space for wires to be placed in the channel running alongside a row of beams but will act as stops that tend to retain the installed wires within those channels.

Figure 5D:
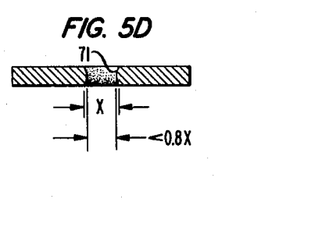
Figure 5E:
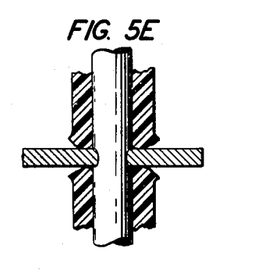

An important preferred feature of the structure shown in FIG. 4 (44); 5A, 5C, 5F, 5G or 5H is the profile of the slot. This appears in four alternative designs in the cross sectional views of FIGS. 5D through 5D'''. In FIG. 5D, the interior edges of the slot are bowed along their length. The profile in FIG. 5D' is similar except the bow is in the form of a shallow "V". Any similar profile is suitable (FIGS. 5D'', 5D'''). This simple structural expedient has been found to be useful in avoiding breakage of wires at the point where they enter or exit the slot. Breakage tends to occur due to stress fatigue if the slot substantially knicks the wire, and the wire experiences substantial movement. The latter typically occurs when wires are moved from one terminal to another, or when wires are moved during circuit testing or rewiring. The reason for the effectiveness of the curved of "V" shaped profile is that the bending stress on the wire within the slot is graduated over the width of the slot, avoiding the sharp stress point that occurs when the wire is knicked outside the vise-like arrangement in which it is held. This will be appreciated from FIGS. 5E and 5E'. The bending stress on the wire 72 in FIG. 5E is graded across the thickness of the slot while in FIG. 5E' it is concentrated at the four corners of the slot. These effects become more pronounced as the wire size becomes smaller. This invention is advantageously used to interconnect wires of 14 gauge or smaller.

The bowing required to effect the above described result must be significant. It cannot be slight or accidental. In a preferred sense the width of the slot at the surface should equal approximately the minimum wire diameter, whereas the width of the slot at the narrowest portion is substantially narrower, by as much as 20%, in order to make reliable connection to the wire.

Figure 5F:
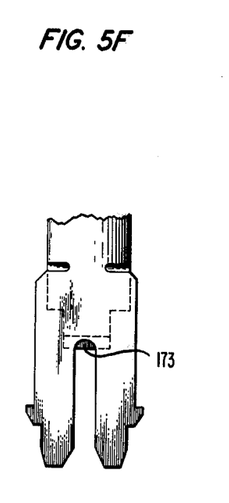
Figure 5G:
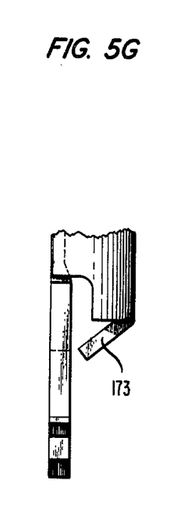
Figure 5H:
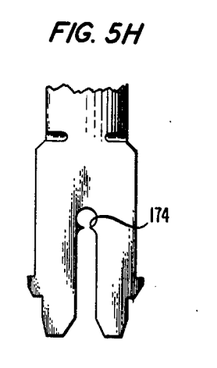

A design that has proved useful in practice appears in FIGS. 5F and 5G. The structure shown is essentially that described previously except that a form of wire stop is shown at 173. This is one of several possible means for preventing wires from sliding to the very bottom of the slot where the beam deflections may not be sufficient to give an effective connection. Other ways of achieving this result will become evident. One of these is shown in FIG. 5H which is a view of the slotted beam portion of the terminal and in which the slot includes protrusions 174 that extend into the slot and prevent wires from sliding to the base of the slot.

Figure 6:
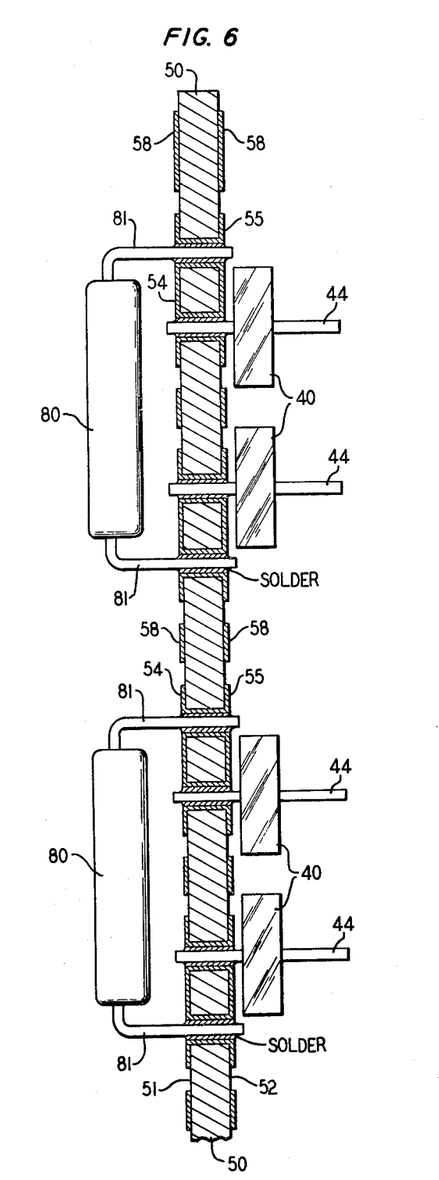
FIG. 6 is a side view in partial cross section showing a portion of the printed circuit board with components and wiring terminals mounted.

Connector modules 40 (FIG. 4) and/or connection elements 60 are mounted to the wiring side 52 of board 50. Components 80 are mounted to the component side 51 of board 50 either by soldering as in FIG. 6, or pushing component pins 81 into sockets 61 of connection elements 60. Connector modules 40 (FIG. 4) can alternatively be mounted on the component side 51 of board 50 together with components 80.

Figure 7A:
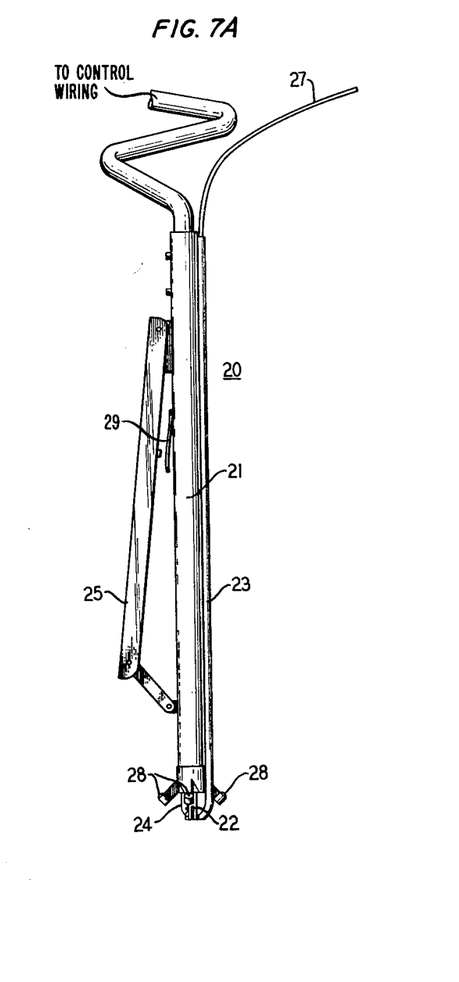
FIG. 7 is a side view of the tool used in this breading technique.

Pursuant to this invention a tool 20 shown in FIG. 7 aids in hand wiring. The tool 20 is comprised of a body 21, a stuffer 22 rigidly affixed thereto, and a conductor feed tube 23. A knife 24 and an activating mechanism 25 is provided to terminate a wire run. Photo transistors 28 may be attached to body 21 for reasons stated later.

Figure 8A:
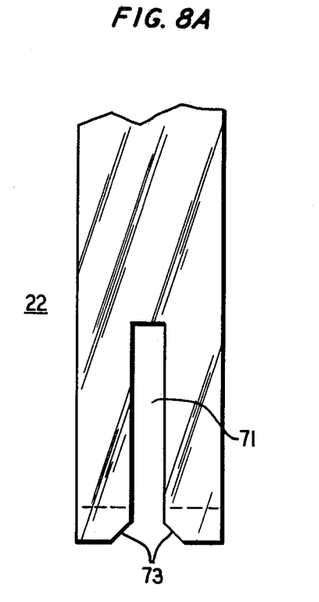
FIG. 8A is a side view of the stuffer portion of said tool.
Figure 8B:
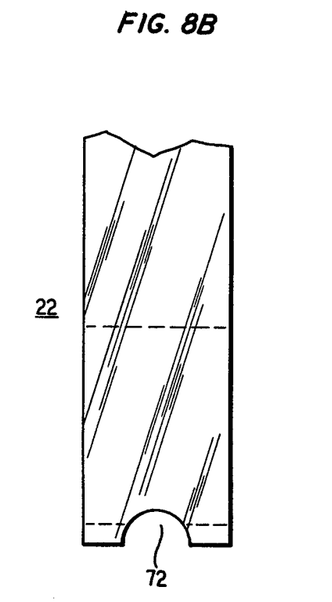
FIG. 8B is a front view of the stuffer portion of said tool.
Figure 8C:
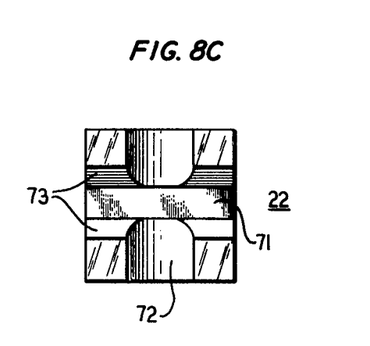
FIG. 8C is a bottom view of the stuffer portion of said tool.

The stuffer 22 is shown in more detail in FIGS. 8A, 8B and 8C. A slot 71 therein provides clearance while the chamber 73 helps guide the stuffer 22 over the IPSBC terminal and while mouth 72 embraces conductor 27.

Figure 9:
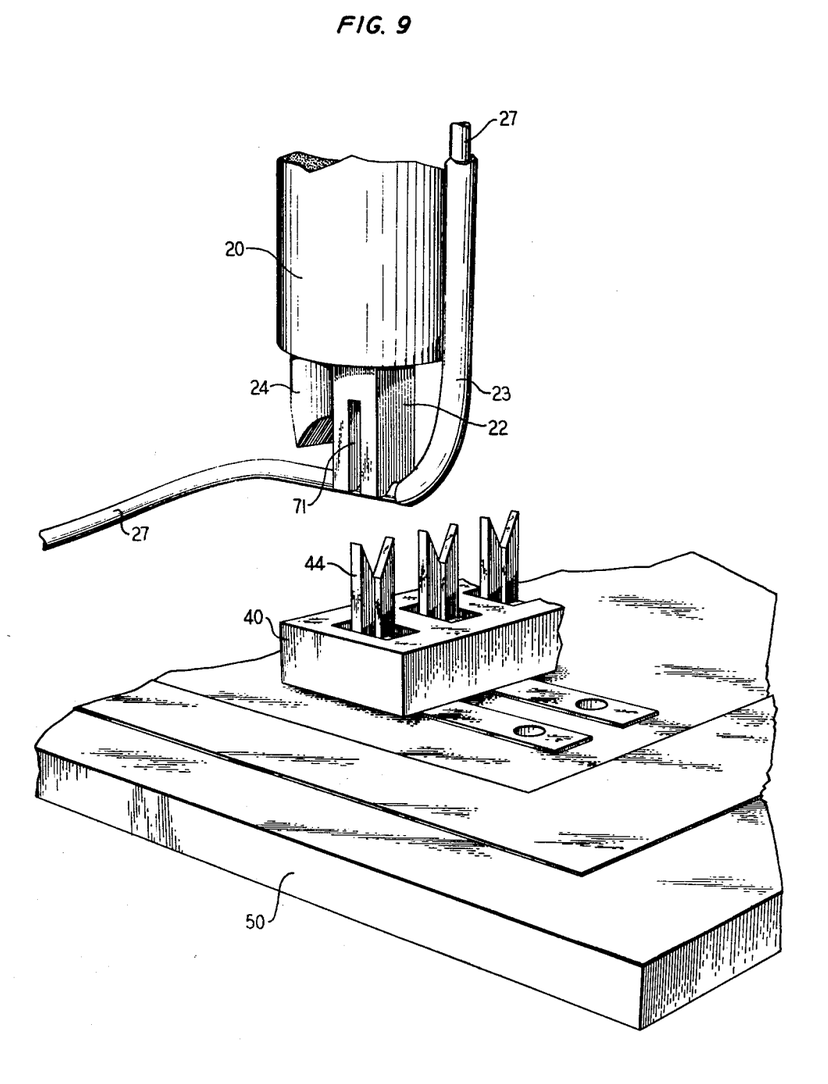
FIG. 9 is a perspective view of a section of printed circuit board with a portion of a connector module mounted thereon, and the lower part of said tool.

A connection is made by pushing an insulated electrical conductor 27, typically 30 gauge, into an appropriate IPSBC terminal with tool 20. FIG. 9 shows tool 20 poised above an IPSBC terminal 44 ready for making a connection.

Figure 10A:
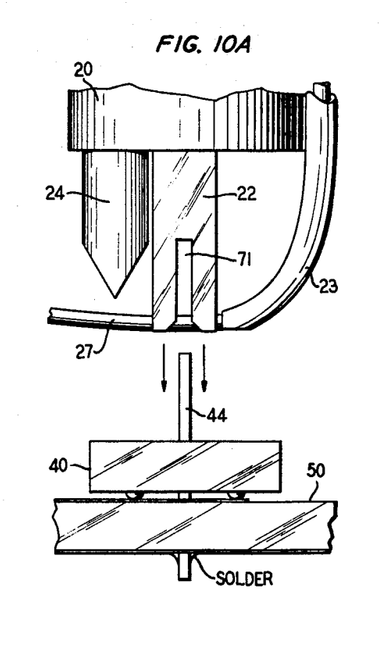
FIG. 10A is a side view of a section of printed cicuit board with a portion of a connector module mounted thereon, and the lower part of said tool just prior to making an electrical connection.
Figure 10B:
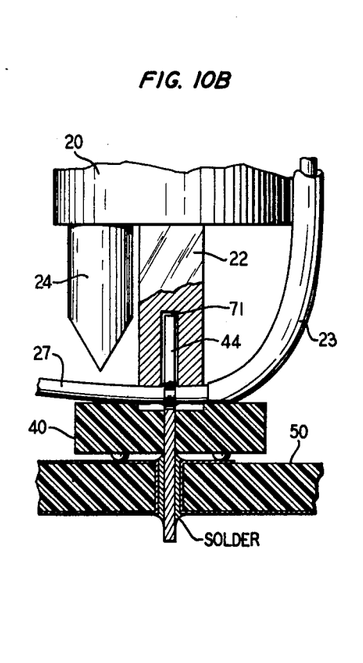
FIG. 10B is a side view in partial section of the same equipment shown in FIG. 10A at the moment the electrical connection is being made.

FIG. 10A and FIG. 10B are a sequence showing tool 20 being lowered to the IPSBC terminal 44 and the connection being made. Tool 20 may then be lifted and moved to the next terminal while the conductor feed tube 23 feeds out the required length of conductor 27.

If that is the last terminal of a wire run, tool 20 may be lifted and moved to the appropriate side of the IPSBC terminal 44 where the activating mechanism 25 is engaged, the knife 24 is extended and the conductor 27 is severed between the blade and the board. A virtue of the design of tool 20 is that after the cut is made, a sufficient length of conductor 27' is left protruding from conductor feed tube 23 to make a new connection.

Figure 11A:
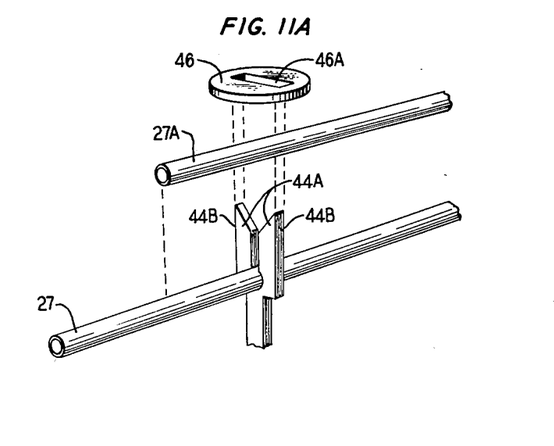
FIG. 11A is a perspective view showing a two-wire to one-terminal connection prior to being made.
Figure 11B:
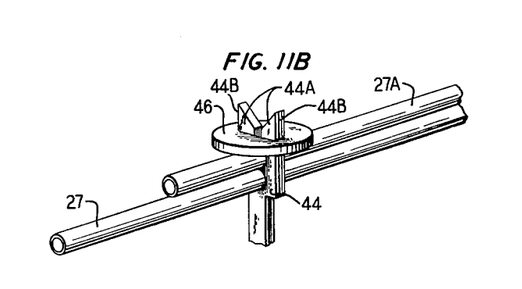
FIG. 11B is a perspective view showing a two-wire to one-terminal connection after the connection has been made.

Frequently a board must undergo changes after it has been wired. When the technique described above is used, adding new connections or removing others is straightforward. It may sometimes be useful to provide an additional means for retaining wires within a slot, e.g., by using washer 46 with a slot 46A of the appropriate length and width, as seen in FIG. 11A. This is especially useful when multiple wires are installed in one slot. A second conductor 27A is shown pushed into the IPSBC terminal 44 directly on top of the first conductor 27. The IPSBC 44 has bifurcations 44A, with tapered outside walls 44B. When the slot 46A of washer 46 is pushed over bifurcations 44A, FIG. 11B, they are squeezed together to ensure a reliable two-wire connection.

Figure 10C:
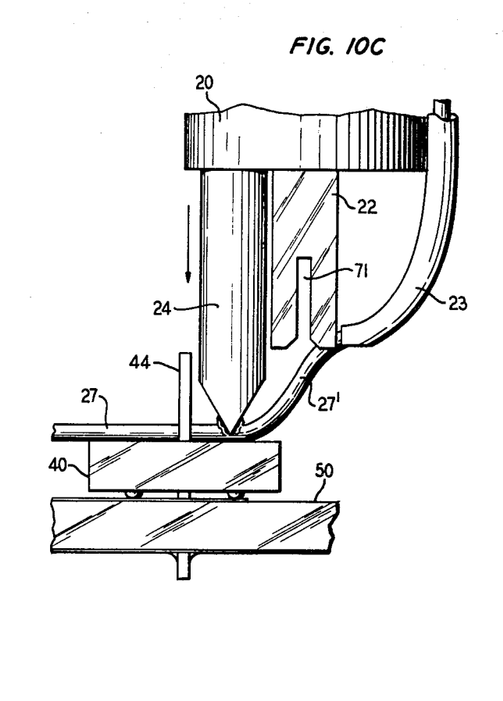
FIG. 10C is a side view of the same equipment shown in FIG. 10A after the electrical connection has been made and at the moment the conductor is being severed. The knife has been protracted and moved to the appropriate location.
Figure 12A:
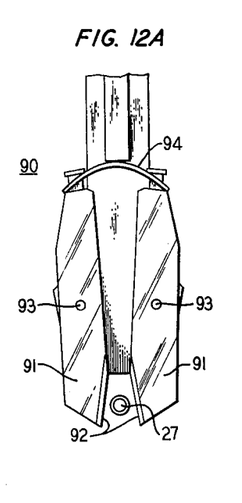
FIG. 12A shows a front view of an alternate wire cutter prior to cutting the conductor.
Figure 12B:
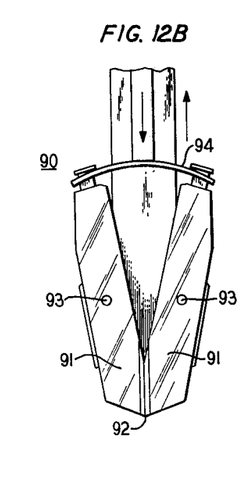
FIG. 12B shows said alternate wire cutter at the moment the conductor is severed.

The knife 24 described above requires a backing such as the body of connector module 40 below the conductor 27 in order to sever said conductor, FIG. 10C. An alternate wire cutter 90 which does not require such a backing is shown in FIG. 12A and FIG. 12B. Wire cutter 90 is comprised of two jaws 91, two cutting edges 92, pivots 93 and a spring 94. When a force is exerted against spring 94 by activating mechanism 25, spring 94 pushes outward against the tops of jaws 91 and causes said jaws to rotate about pivots 93, and creates a shearing action between cutting edges 92.

Figure 12C:
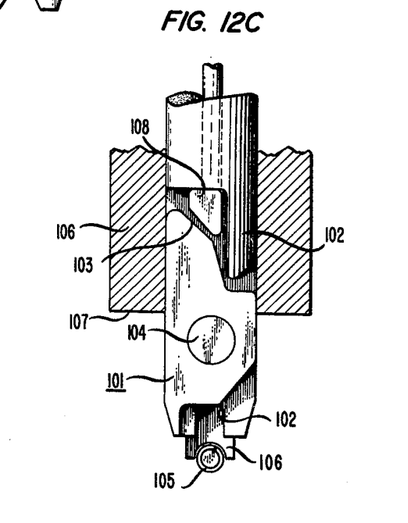
FIG. 12C shows another alternative wire cutter structure.

A slightly different cutting structure is shown in FIG. 12C. Here the cutter assembly 101 consists of a stationary cutting surface 102, and a pivoted cutter mounted at rivet 104. The assembly is free to slide as shown to engage wire 105 as it is installed by guide 106. This latter element is the same as that shown at 22 in FIGS. 7A, 8A, 8B, and 8C. When the assembly 101 emerges far enough to clear end 107 of the tool, element 102 hits a stop on element 106 which prevents it from moving further, now the cam action of pusher 108 against the movable cutter edge 103 causes it to pivot against the wire and the mating cutter 102.

Figure 13:
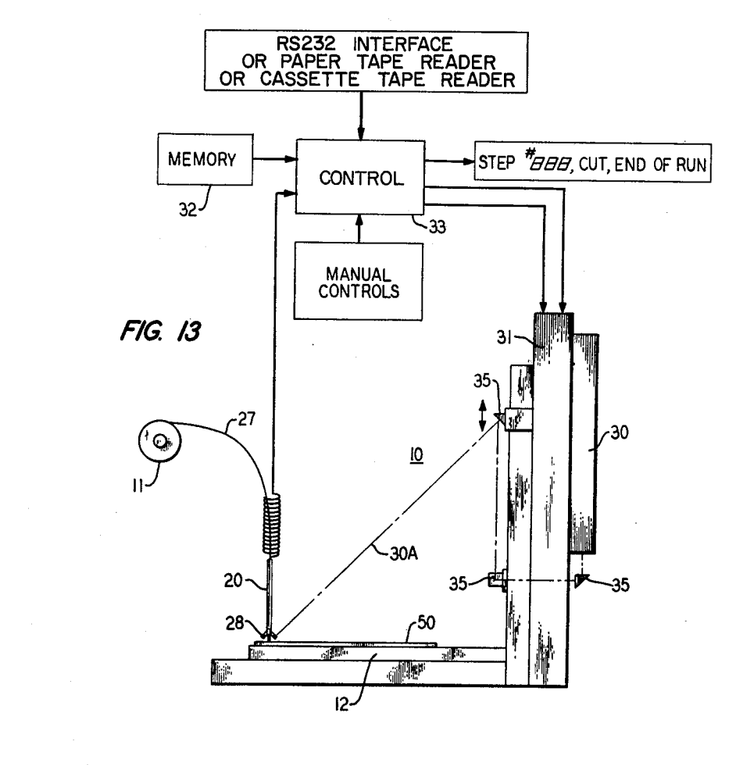
FIG. 13 is a schematic side view of a semiautomatic wiring machine.
Figure 14:
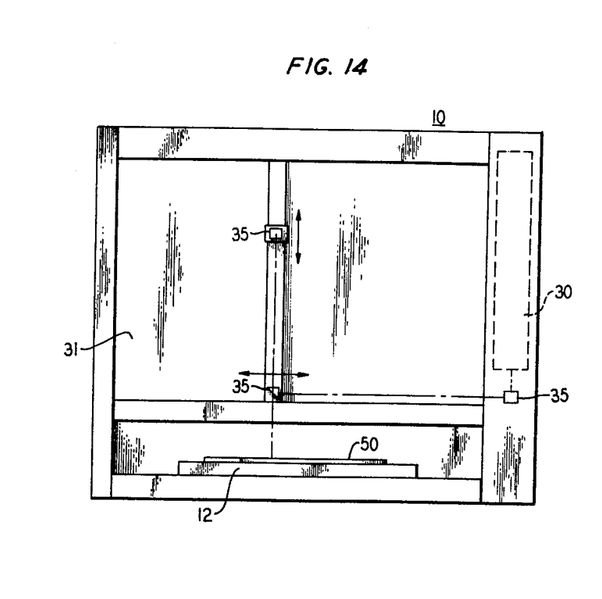
FIG. 14 is a schematic front view of a semiautomatic wiring machine.
Figure 15:
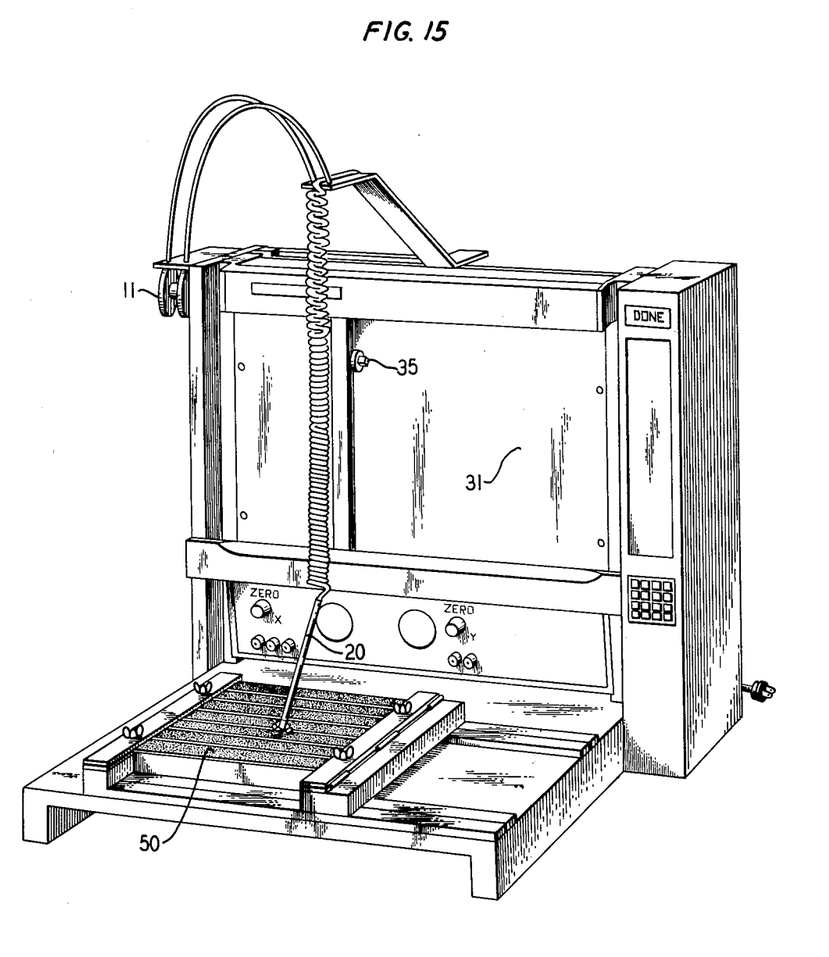
FIG. 15 is a perspective view of a semiautomatic wiring machine.

A semiautomatic wiring machine 10 shown in FIGS. 13, 14 and 15 makes an advantageous combination with the invention so far disclosed. Essentially this machine is comprised of a stationary mounting surface 12 for the printed circuit board 50, and X-Y recorder 31 or equivalent, a laser 30, the aforementioned tool 20 with phototransistors 28 and cutter switch mounted thereon, a source of insulated electrical conductor 11, digital memory bank 32, and conventional associated electronics (not shown).

The schematic or layout information of a circuit to be breadboarded is placed in the format of a computer program. The program generates a sequence of X-Y locations including end-of-run and job-complete information. This information is loaded into the digital memory bank 32 via the RS232-C interface from a computer memory or, alternatively a paper tape reader or cassette reader before a wiring job is begun. The memory has a capacity to store 5000 wiring points. A parity bit is transmitted with the data corresponding to a wiring point to assure error detection. When memory is loaded directly from computer memory the machine generates the protocol to log on and instructs the computer to get the desired data set. The X-Y coordinates control the X-Y recorder 31. During wiring the control circuit gets the appropriate set of X-Y coordinates from the memory bank.

the laser beam 30A is deflected by prisms 35 mounted on X-Y recorder 31 to illuminate with a spot of light the appropriate IPSBC terminal. The operator makes a connection to the spotlighted IPSBC terminal using tool 20. As tool 20 pushes conductor 27 into said IPSBC terminal, phototransistor 28 mounted on said tool 20 intercepts laser beam 30A and generates a pulse that makes the control 33 fetch the next set of X-Y coordinates.

The end of a wire run is indicated by a certain code of the X-Y coordinates. This condition energizes an appropriate indicator, and when the wire cutter switch of tool 20 is operated, the laser beam 30A is made to move to the beginning of the next wire run. When the wiring is completed, a certain code of the last set of X-Y coordinates indicates to the operator that the particular job is done by displaying the word "done" in the alphanumeric display.

A fully automatic wiring machine that performs the functions mentioned above is envisioned within the scope of this invention wherein actuators serve to operate a modified tool similar to tool 20.

The discrete wiring technique described is quite durable and dependable. However a wired board may be subject to rough handling and extreme environmental conditions in a field trial. In these instances, the reliability of said wired board could be further enhanced by vacuum packaging the wired board similar to the vacuum packaging used on some products sold in department stores. The holes 53 in printed circuit 50 conveniently adapt to this process.

I claim:

1. System for electrically wiring electrical components onto a circuit board comprising:
   (1) a stationary mounting surface for supporting the circuit board
   (2) a wiring tool for inserting electrical wire into selected wire receptacles on the circuit board, said wiring tool comprising an elongated housing, means for feeding electrical wire along the housing, applicator means at one end of the housing for inserting electrical wire into selected wire receptacles in the circuit board,
   (3) selector means for selecting receptacles in the circuit board, said selector means comprising a light source for generating a beam of light, deflector means for moving the light beam along the circuit board to illuminate selected receptacles on the circuit board, control means for positioning the deflector means, memory means connected to said control means for generating electrical command signals in a predetermined sequence and deflect the light beam in response to that sequence,
   light detection means mounted on the wiring tool, for generating an electrical output signal when exposed to the light beam, and
   electrical interconnection means between the light detection means and the memory means for activating the electrical command signals from the memory means.

2. System of claim 1 further including cutting means adjacent the applicator means on the wiring tool, said cutting means adapted when activated to cut the electrical wire, and electrical means for activating the cutting means.

3. System of claim 2 in which the electrical means for activating the cutting means is electrically connected to the memory means and is activated in response to electrical signals from the memory means.

4. System of claim 1 in which the light source is a laser.

* * * * *